United States Patent [19]

Nishita

[11] Patent Number: 5,014,821

[45] Date of Patent: May 14, 1991

[54] LUBRICATING SYSTEM FOR AIR FEED PIPE LINES LAID IN A FACTORY

[75] Inventor: Kunio Nishita, Matto, Japan

[73] Assignee: Kabushiki Kaisha Komatsu Seisakusho, Tokyo, Japan

[21] Appl. No.: 403,753

[22] Filed: Sep. 6, 1989

[51] Int. Cl.$^5$ .................................................. F16N 7/34
[52] U.S. Cl. ..................... 184/55.2; 184/6.26
[58] Field of Search .................. 184/55.1, 55.2, 6.26, 184/7.4

[56] References Cited

U.S. PATENT DOCUMENTS 4,169,520 10/1979 Lewkowicz et al. ................ 184/7.4

FOREIGN PATENT DOCUMENTS 0115819 8/1984 European Pat. Off. ........... 184/6.26
55-126193 9/1980 Japan .
56-32196 8/1981 Japan .

Primary Examiner—Ira S. Lazarus
Assistant Examiner—Alan B. Cariaso
Attorney, Agent, or Firm—Frost & Jacobs

[57] ABSTRACT

A lubricating system for air feed pipe lines laid in a factory having its essential feature in that it was made possible to inject lubricating oil into air feed pipe lines consisting of two, high-pressure and low-pressure, systems with one set of lubricating oil injection device by making use of ON-OFF operations of a high-pressure air source. The subject lubricating system comprises a switching valve (8) provided in a bypass air pipe line (7b) connecting a high-pressure side air feed pipe line (1) with an inlet (6a) of a lubricating oil injection device (6) and switched to a communicating position ($8_1$) when a high-pressure air source (3) is ON but to a blocking position ($8_2$) when it is OFF, and another switching valve (11) provided in first and second lubricating oil injected air pipe lines (9a, 9b) connected between an outlet (6b) of the lubricating oil injection device (6) and the high-pressure and low-pressure air feed pipe lines (1, 2) and adapted to allow air injected with lubricating oil to flow into the high-pressure side air feed pipe line (1) when the high-pressure air source (3) is ON but into the low pressure side air feed pipe line (2) when it is OFF.

3 Claims, 2 Drawing Sheets

LUBRICATING SYSTEM FOR AIR FEED PIPE LINES LAID IN A FACTORY

TECHNICAL FIELD OF THE INVENTION

The present invention relates to a lubricating system for air feed pipe lines of two, high-pressure and low-pressure systems laid in a factory.

BACKGROUND OF THE INVENTION

In the prior art, air feed pipe lines laid in a factory are grouped into two systems consisting of high-pressure air feed pipe lines and low-pressure air feed pipe lines, respectively, and these air feed pipe lines are introduced to various kinds of machines disposed in the factory to be utilized as drive power sources.

In addition, in the air fed through the air feed pipe lines in mixed lubricating oil, and by lubricating a slide portion of an actuator with this lubricating oil, smoothening of the operation of the actuator and prevention of abrasion of the slide portion are contemplated, but in the prior art, for instance as shown in FIG. 1, a lubricating oil injection device b is provided only in a low-pressure side air feed pipe line a, and lubricating oil is injected only to the side of the low-pressure air feed pipe line.

In the above-described lubricating system in the prior art, in the case where it is intended to inject lubricating oil also to a high-pressure side air feed pipe line c, a pipe line d connecting the low-pressure side air feed pipe line a with the lubricating oil injection device b, is connected to the high-pressure side air feed pipe line c through a pipe line e to introduce the pressure in the high-pressure side air feed pipe line c into the lubricating oil injection device b, and further, unless this introduced pressure is enhanced by a booster f, the air injected with the lubricating oil cannot be returned to the high-pressure side air feed pipe line c.

However, in the event that the high-pressure side air feed pipe line c and the pipe line d leading to the lubricating oil injection device b are connected through the pipe line e, the high-pressure side air would flow into the low-pressure side, resulting in a disadvantage that the pressure in the high-pressure side air feed pipe c is lowered.

Therefore, in the lubricating system in the prior art, the lubricating oil injection device b had to be provided for each of the high-pressure side air feed pipe line c and the low-pressure side air feed pipe line a, and so, there was inconvenience that the expense became large, and also a lot of space was necessitated for installing two sets of lubricating oil injection devices b.

SUMMARY OF THE INVENTION

The present invention has been worked out in view of the above-mentioned circumstance. One object of the invention is to provide a lubricating system for air feed pipe lines, in which lubricating oil can be injected to air feed pipe lines of two, high-pressure and low-pressure, systems laid in a factory with one set of lubricating oil injection device, and thereby saving of various expenses and reduction of an installation space are made possible.

In order to achieve the aforementioned object, according to a first aspect of the present invention, there is provided a lubricating system for air feed pipe lines laid in a factory and consisting of a high-pressure side air feed pipe line connected to a high-pressure air source performing ON-OFF operations and a low-pressure side air feed pipe line connected to a low-pressure air source; which comprises a bypass air feed pipe line connected between a pipe line connecting the aforementioned low-pressure side air feed pipe line with an inlet of lubricating oil injection means and the aforementioned high-pressure side air feed pipe line, a switching valve provided in the above-mentioned bypass air feed pipe line and switched to a communicating position when the high-pressure air source is ON but to a blocking position when the high-pressure air source is OFF, a second lubricating oil injected air pipe line provided in parallel to a first lubricating oil injected air pipe line connecting oil injection means with the above-mentioned low-pressure ride air feed pipe line and having one end connected to the above-described high-pressure side air feed pipe line, and another switching valve having the other end of the above-mentioned second lubricating oil injected air pipe line connected to one outlet port thereof and having the above-metnioned first lubricating oil injected air pipe line connected to one inlet port and the other outlet port thereof, whereby the air injected with lubricating oil is made to flow into the high-pressure side air feed pipe line when the aforementioned high-pressure air source is ON, while the air injected with lubricating oil is made to flow into the low-pressure side air feed pipe line when the above-described high-pressure air source is OFF.

According to a second aspect of the present invention, there is provided a lubricating system for air feed pipe lines laid in a factory, characterized in that the respective switching valves in the above-described first aspect are electromagnetic valves.

According to a third aspect of the present invention, there is provided a lubricating system for air feed pipe lines laid in a factory, characterized in that the switching valve provided in the bypass air feed pipe line in the above-described first aspect is an electromagnetic valve of pilot system.

The above-mentioned and other objects, aspects and advantages of the present invention will become apparent for those skilled in the art from the explanation taken in conjunction with the following description and the accompanying drawings, wherein a preferred embodiment conformable with the principle of the present invention is disclosed as a practical example of embodiment.

DETAILED DESCRIPTION OF THE PREFERRED EMBODIMENT

One preferred embodiment of the present invention will be described in detail in the following with reference to FIG. 2.

Figure 1:
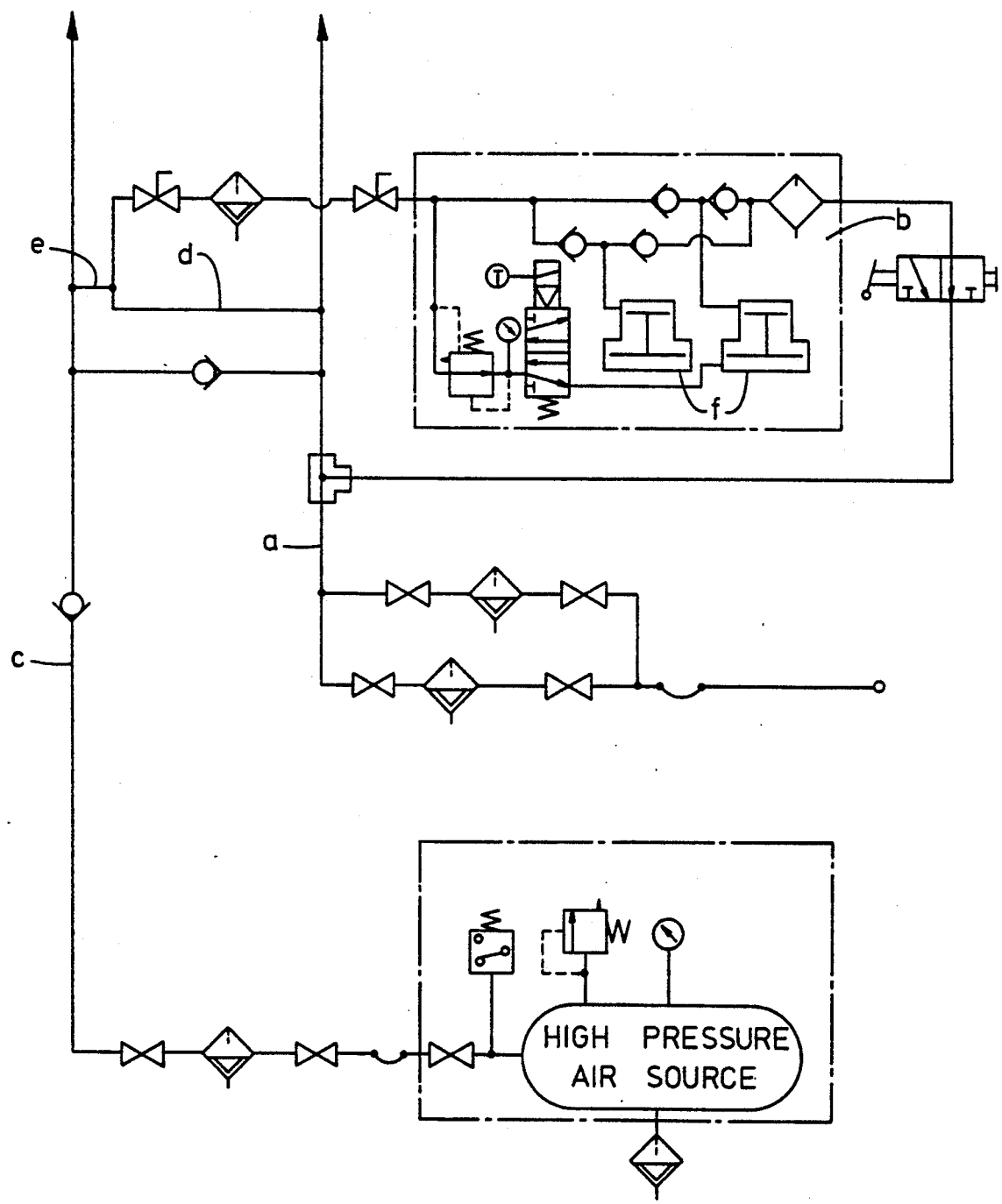
FIG. 1 is a schematic circuit diagram showing one example in the prior art.
Figure 2:
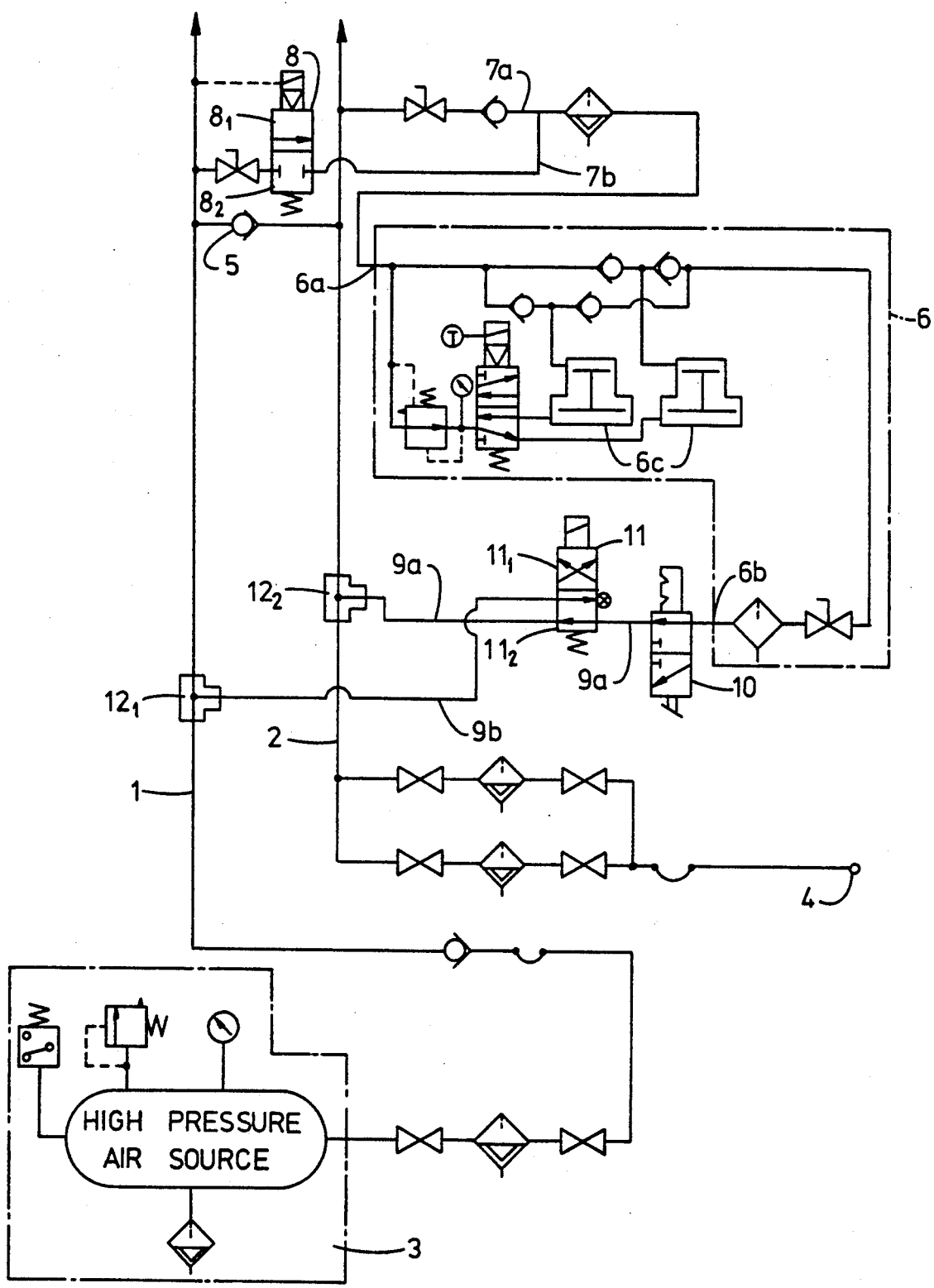
FIG. 2 is a schematic circuit diagram showing one preferred embodiment of the present invention.

In FIG. 2, reference numerals 1 and 2 respectively designate high-pressure side and low-pressure side air feed pipe lines laid in a factory not shown, and they are respectively connected to a high-pressure air source 3 and a low-pressure air source 4.

Reference numeral 5 designates a check valve connected between the above-mentioned high-pressure side air feed pipe line 1 and low-pressure side air feed pipe line 2, so that communication is admitted only from the low-pressure side air feed pipe line 2 to the high-pressure side air feed pipe line 1, and in the event that the high-pressure side air feed pipe line 1 should have its pressure reduced lower than the low-pressure side air feed pipe line 2 due to any reason, the air in the low-pressure side air feed pipe line 2 would flow into the high-pressure side air feed pipe line 1.

Reference numeral 6 designates a lubricating oil injection device, and its inlet 6a is connected to the low-pressure side air feed pipe line 2 via a pipe line 7a. Between the above-mentioned pipe line 7a and the high-pressure side air feed pipe line 1 is connected a bypass air feed pipe line 7b, and in the above-described bypass air feed pipe line 7b is provided a switching valve 8 consisting of an electromagnetic valve or the like, which valve is switched to a communicating position $8_1$ when the high-pressure air source 3 is ON but to a blocking position $8_2$ when the high-pressure air source 3 is OFF by introducing a pilot pressure thereto from the high-pressure side air feed pipe line 1. It is to be noted that in FIG. 2 is illustrated an electromagnetic switching valve of pilot system.

On the other hand, the lubricating oil injection device 6 includes two boosters 6c which boost the air pressure introduced through the inlet 6a and deliver to the side of the outlet 6b, and provision is made such that lubricating oil may be injected into the air boosted in pressure by the boosters 6c. The air injected with lubricating oil is sent through a first lubricating oil injected air pipe line 9a and a switching valve 11 to either one of joints $12_1$ and $12_2$ respectively provided in the high-pressure side and low-pressure side air feed pipe lines 1 and 2, and it is fed to the high-pressure side air feed pipe line 1 or the low-pressure side air feed pipe line 2 through the joint $12_1$ or $12_2$.

In more particular, a second lubricating oil injected air pipe line 9b connected to the joint $12_1$ provided in the high-pressure air feed pipe line 1, is provided in parallel to the first lubricating oil injected air pipe line 9a, and the other end of this pipe line 9b is connected to one outlet port of the switching valve 11. In addition, the first lubricating oil injected air pipe line 9a connecting the outlet 6b of the lubricating oil injection device 6 to the joint $12_2$ provided in the low-pressure side air feed pipe line 2, is connected to one inlet port and the other outlet port of the switching valve 11.

It is to be noted that reference numeral 10 designates a switching valve, and this switching valve 10 is a manually operated pressure escape valve for allowing high-pressure air in the boosters 6c to escape when the lubricating oil is supplemented.

The above-described switching valve 11 is adapted to operate synchronously with the switching valve 8 provided on the side of the inlet 6a of the lubricating oil injection device 6, so that it allows the air injected with lubricating oil to flow into the high-pressure side air feed pipe line 1 when the high-pressure air source 3 is ON but into the low-pressure side air feed pipe line 2 when the high pressure air source 3 is OFF.

Now description will be made on the operations relating to the above-described one preferred embodiment of the lubricating system.

The high pressure air source 3 is normally repeating ON-OFF operations, and when the pressure in the high-pressure side air feed pipe line has lowered and the high-pressure air source 3 has turned to ON, the switching valve 8 which has been so far held at the blocking position $8_2$, is switched to the communicating position $8_1$, hence air in the high-pressure side air feed pipe line 1 flows into the lubricating oil injection device 6, and after it has been boosted in pressure by the boosters 6c, it is injected with lubricating oil and is pipe line 9a.

Furthermore, simultaneously with switching of the switching valve 8, the switching valve 11 is switched from a low-pressure side position $11_2$ to a high-pressure side position $11_1$, so that the air injected with lubricating oil which has been delivered to the pipe line 9a, flows into the high-pressure side air feed pipe line 1 through the high-pressure side position $11_1$ and the second lubricating oil injected air pipe line 9b, and thus lubricating oil would be injected into air line 1.

On the other hand, if the high-pressure side air feed pipe line 1 becomes high pressure and the high-pressure air source 3 is turned OFF, then the switching valve 8 is switched to the blocking position $8_2$, and the switching valve 11 is switched to a low-pressure side position $11_2$.

Thereby after lubricating oil has been injected to the air flowed from the low-pressure side air feed pipe line 2 in the lubricating oil injection device 6, the air injected with lubricating oil is made to flow into the low-pressure side air feed pipe line 2 through the low-pressure side position $11_2$ of the switching valve 11 and the first lubricating oil injected air pipe line 9a, and thus lubricating oil would be injected into air flowing through the low-pressure side air feed pipe line 2.

As explained above, with lubricating system according to the present invention, since only one set lubricating oil injection device, which was necessitated two sets in the prior art, can suffice, saving of expense as well as reduction of space for installation can be achieved.

What is claimed:

1. A lubricating system for air feed pipe lines laid in a factory and consisting of a high-pressure side air feed pipe line connected to a high-pressure air source performing ON-OFf operations and a low-pressure side air feed pipe line connected to a low-pressure air source; comprising a bypass air feed pipe line connected between a pipe line connecting said low-pressure side air feed pipe line with an inlet of lubricating oil injection means and said high-pressure side air feed pipe line, a swiching valve provided in said bypass air feed pipe line and switched to a communicating position when the high-pressure air source is ON but to a blocking position when the high-pressure air source is OFF, a second lubricating oil injected air pipe line arranged in parallel to a first lubricating oil injected air pipe line, said first lubricating oil injected air pipe line being caused to connect an outlet of said lubricating oil injection means with said low-pressure side air feed pipe line, and connected at one end thereof to said high-pressure side air feed pipe line, and another switching valve having one outlet port to which the other end of said second lubricating oil injected air pipe line is connected, another outlet port to which said first lubricating oil injected air pipe line is connected, and an inlet port to which the outlet of said lubricating oil injection means is connected through said first lubricating oil injected air pipe line, whereby the air injected with lubricating oil is made to flow into the high-pressure side air feed pipe line when said high-pressure air source is ON, while the air injected with lubricating oil is made to flow into the low-pressure side air feed pipe line when said high-pressure air source is OFF.

2. A lubricating system as claimed in claim 1, characterized in that said respective switching valves are electromagnetic valves.

3. A lubricating system as claimed in claim 1, characterized in that the switching valve provided in said bypass air feed pipe line is an electromagnetic valve of pilot system.

* * * * *